(12) United States Patent
Mon Divakaran et al.

(10) Patent No.: US 12,519,830 B2
(45) Date of Patent: Jan. 6, 2026

(54) SYSTEMS AND METHODS FOR DETECTION OF PHISHING WEBPAGES USING MACHINE LEARNING

(71) Applicant: Acronis International GmbH, Schaffhausen (CH)

(72) Inventors: Dinil Mon Divakaran, Singapore (SG); Candid Wüest, Bassersdorf (CH); Serg Bell, Costa Del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 162 days.

(21) Appl. No.: 18/483,726

(22) Filed: Oct. 10, 2023

(65) Prior Publication Data

US 2025/0119452 A1    Apr. 10, 2025

(51) Int. Cl.
*H04L 9/40*    (2022.01)

(52) U.S. Cl.
CPC ................. *H04L 63/1483* (2013.01)

(58) Field of Classification Search
USPC .......................................................... 726/23
See application file for complete search history.

(56) References Cited

U.S. PATENT DOCUMENTS

| | | | |
|---|---|---|---|
| 11,997,115 B1 * | 5/2024 | Higbee | G06F 16/35 |
| 2010/0211997 A1 * | 8/2010 | McGeehan | H04L 63/107 |
| | | | 726/4 |
| 2016/0142439 A1 * | 5/2016 | Goutal | H04L 63/1425 |
| | | | 726/22 |
| 2021/0234837 A1 * | 7/2021 | Dahan | H04L 63/104 |

FOREIGN PATENT DOCUMENTS

| | | | | |
|---|---|---|---|---|
| WO | WO-2020110109 A1 * | 6/2020 | ......... | H04L 63/1483 |
| WO | WO-2023139129 A1 * | 7/2023 | ......... | G06F 16/9535 |

OTHER PUBLICATIONS

Abdelnabi et al., "VisualPhishNet: Zero-Day Phishing Website Detection by Visual Similarity," In: Proc. ACM CCS, 2020, pp. 1-18.

Bozkir et al., "LogoSENSE: A companion HOG based logo detection scheme for phishing web page and E-mail brand recognition," Computers & Security, Aug. 2020, vol. 95, No. 101855, pp. 1-9.

(Continued)

*Primary Examiner* — Sakinah White Taylor
(74) *Attorney, Agent, or Firm* — ArentFox Schiff LLP; Michael Fainberg

(57) ABSTRACT

Disclosed herein are systems and method for reference-based detection of phishing webpages. In one aspect, a method includes inputting, for a webpage with a first domain, (1) textual data into a machine learning model (MLM) that outputs a first vector with probabilities of the textual data being associated with known brands, (2) HTML data into an MLM that outputs a second vector with probabilities of the HTML data being associated with the known brands, (3) at least one image into an MLM that outputs a third vector with probabilities of the at least one image being associated with the known brands. The model may input the first, second, and third vectors into an MLM that outputs a brand of the webpage. The method may block the webpage in response to determining that the first domain of the webpage does not match at least one domain corresponding to the brand.

15 Claims, 6 Drawing Sheets

(56) References Cited

OTHER PUBLICATIONS

Divakaran et al., "Phishing Detection Leveraging Machine Learning and Deep Learning: A Review," IEEE Security & Privacy, Sep.-Oct. 2022, vol. 20, 10 pages.
Lin et al., "Phishpedia: A Hybrid Deep Learning Based Approach to Visually Identify Phishing Webpages," In: Proc. 30th USENIX Security Symposium, Aug. 11-13, 2021, vol. 30, pp. 3793-3810.
Liu et al., "Inferring Phishing Intention via Webpage Appearance and Dynamics: A Deep Vision Based Approach," In: Proc. 31st USENIX Security Symposium, Aug. 10-12, 2022, vol. 31, pp. 1633-1650.
Van Den Hout et al., "LogoMotive: detecting logos on websites to identify online scams," SIDN Labs, In: Proc. PAM 2022, pp. 1-2.
Wang et al., "Verilogo: Proactive Phishing Detection via Logo Recognition," Department of Computer Science and Engineering, University of California, San Diego, Aug. 18, 2011, pp. 1-20.

* cited by examiner

SYSTEMS AND METHODS FOR DETECTION OF PHISHING WEBPAGES USING MACHINE LEARNING

FIELD OF TECHNOLOGY

The present disclosure relates to the field of data security, and, more specifically, to systems and methods for reference-based detection of phishing webpages.

BACKGROUND

Phishing is one of the most common cybercrimes in modern times. Although many malware solutions use block lists, they are incapable of detecting new, never before seen "zero-day" phishing webpages. Recent solutions have used machine learning (ML) to classify webpages as phishing or benign, by training a supervised model on large datasets of labeled webpages. Despite these efforts, attackers come up with newer techniques that can evade such solutions. This requires constant retraining with new samples in order to catch up with the detection. Ultimately, this results in the extensive use of memory (e.g., to store large datasets) and processing (e.g., to re-train the detection algorithm), but does not guarantee that phishing will be better protected against.

SUMMARY

In one exemplary aspect, the techniques described herein relate to a method for reference-based detection of phishing webpages, the method including: extracting textual data, HTML data, and at least one image of a webpage with a first domain; inputting the textual data into a first machine learning model configured to output a first vector including, for each respective brand of a plurality of brands, a respective probability of the textual data being associated with the respective brand; inputting the HTML data into a second machine learning model configured to output a second vector including, for each respective brand of the plurality of brands, a respective probability of the HTML data being associated with the respective brand; inputting the at least one image into a third machine learning model configured to output a third vector including, for each respective brand of the plurality of brands, a respective probability of the at least one image being associated with the respective brand; inputting the first vector, the second vector, and the third vector into a fourth machine learning model configured to output a brand that the webpage is associated with; identifying at least one domain corresponding to the brand; and blocking the webpage in response to determining that the first domain of the webpage does not match the at least one domain corresponding to the brand.

In some aspects, the techniques described herein relate to a method, wherein inputting the at least one image into a third machine learning model further includes: inputting the at least one image into a fifth machine learning model configured to output a fourth vector including, for each respective image of the at least one image, a respective probability of the respective image being a logo; ranking each of the at least one image based on the fourth vector, wherein images with a higher probability of being a logo are ranked higher than other images; and inputting an image into the third machine learning model based on the ranking.

In some aspects, the techniques described herein relate to a method, wherein the at least one image includes a first image and a second image, wherein inputting the image into the third machine learning model based on the ranking further includes: inputting the first image into the third machine learning model, wherein the third machine learning model further outputs probabilities for each of the plurality of brands; in response to determining that at least one of the probabilities is greater than a threshold probability, not inputting the second image into the third machine learning model.

In some aspects, the techniques described herein relate to a method, further including: in response to determining that none of the probabilities is greater than the threshold probability, inputting the second image into the third machine learning model.

In some aspects, the techniques described herein relate to a method, further including: in response to determining that the first domain of the webpage does not match the at least one domain corresponding to the brand, identifying the webpage as a phishing webpage; adding an identifier of the webpage in a block list of webpages to automatically block.

In some aspects, the techniques described herein relate to a method, further including: in response to determining that the first domain of the webpage matches the at least one domain corresponding to the brand, generating the webpage for display.

In some aspects, the techniques described herein relate to a method, further including: in response to determining that the first domain of the webpage matches the at least one domain corresponding to the brand, identifying the webpage as a safe webpage; and adding an identifier of the webpage in a white list of webpages to not block.

In some aspects, the techniques described herein relate to a method, wherein extracting the textual data, the HTML data, and the at least one image of the webpage is in response to receiving a request to generate the webpage for display.

It should be noted that the methods described above may be implemented in a system comprising a hardware processor. Alternatively, the methods may be implemented using computer executable instructions of a non-transitory computer readable medium.

In some aspects, the techniques described herein relate to a system for reference-based detection of phishing webpages, including: at least one memory; at least one hardware processor coupled with the at least one memory and configured, individually or in combination, to: extracting textual data, HTML data, and at least one image of a webpage with a first domain; inputting the textual data into a first machine learning model configured to output a first vector including, for each respective brand of a plurality of brands, a respective probability of the textual data being associated with the respective brand; inputting the HTML data into a second machine learning model configured to output a second vector including, for each respective brand of the plurality of brands, a respective probability of the HTML data being associated with the respective brand; inputting the at least one image into a third machine learning model configured to output a third vector including, for each respective brand of the plurality of brands, a respective probability of the at least one image being associated with the respective brand; inputting the first vector, the second vector, and the third vector into a fourth machine learning model configured to output a brand that the webpage is associated with; identifying at least one domain corresponding to the brand; and blocking the webpage in response to determining that the first domain of the webpage does not match the at least one domain corresponding to the brand.

In some aspects, the techniques described herein relate to a non-transitory computer readable medium storing thereon computer executable instructions for reference-based detection of phishing webpages, including instructions for: extracting textual data, HTML data, and at least one image of a webpage with a first domain; inputting the textual data into a first machine learning model configured to output a first vector including, for each respective brand of a plurality of brands, a respective probability of the textual data being associated with the respective brand; inputting the HTML data into a second machine learning model configured to output a second vector including, for each respective brand of the plurality of brands, a respective probability of the HTML data being associated with the respective brand; inputting the at least one image into a third machine learning model configured to output a third vector including, for each respective brand of the plurality of brands, a respective probability of the at least one image being associated with the respective brand; inputting the first vector, the second vector, and the third vector into a fourth machine learning model configured to output a brand that the webpage is associated with; identifying at least one domain corresponding to the brand; and blocking the webpage in response to determining that the first domain of the webpage does not match the at least one domain corresponding to the brand.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for reference-based detection of phishing webpages. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

To address the shortcomings of conventional phishing detection solutions, the present disclosure describes an orthogonal approach to binary classification of webpages. This approach is called reference-based phishing detection, in which a given webpage is analyzed to detect if the webpage tries to imitate a well-known brand. In particular, the present disclosure establishes a new reference-based solution that uses multiple artificial intelligence (AI) models to identify the brand being represented by a webpage and verify its legitimacy. Statistically, modeling even a limited number of well-known target brands (e.g., PayPal, Facebook, etc.) is able to cover more than 99% of all targeted websites. The systems and methods of the present disclosure do not require engineering of features. Accordingly, constant retraining of the model when new phishing techniques appear is not necessary.

Phishing webpages often attempt to get users to relinquish personal or financial information. In order to gain the trust of users, phishing webpages model themselves after trustworthy websites. For example, a phishing webpage may include the logo of a trustworthy brand and may try to mimic the style of the brand's webpage. However, despite the convincing appearance, the domain of the phishing webpage will not match the domain of the trustworthy webpage.

On a high-level, the disclosed method involves learning the styles of webpages of a given legitimate website using an AI model, and using the learned styles to identify the targeted brand by a phishing webpage. The method may further include using another AI model to classify the images on a webpage (e.g., a logo identifier model for brand recognition), identifying, using yet another AI model, the brand from the texts of a webpage, and combining the output of all AI models to make a final prediction of whether the webpage is legitimate.

Figure 1:
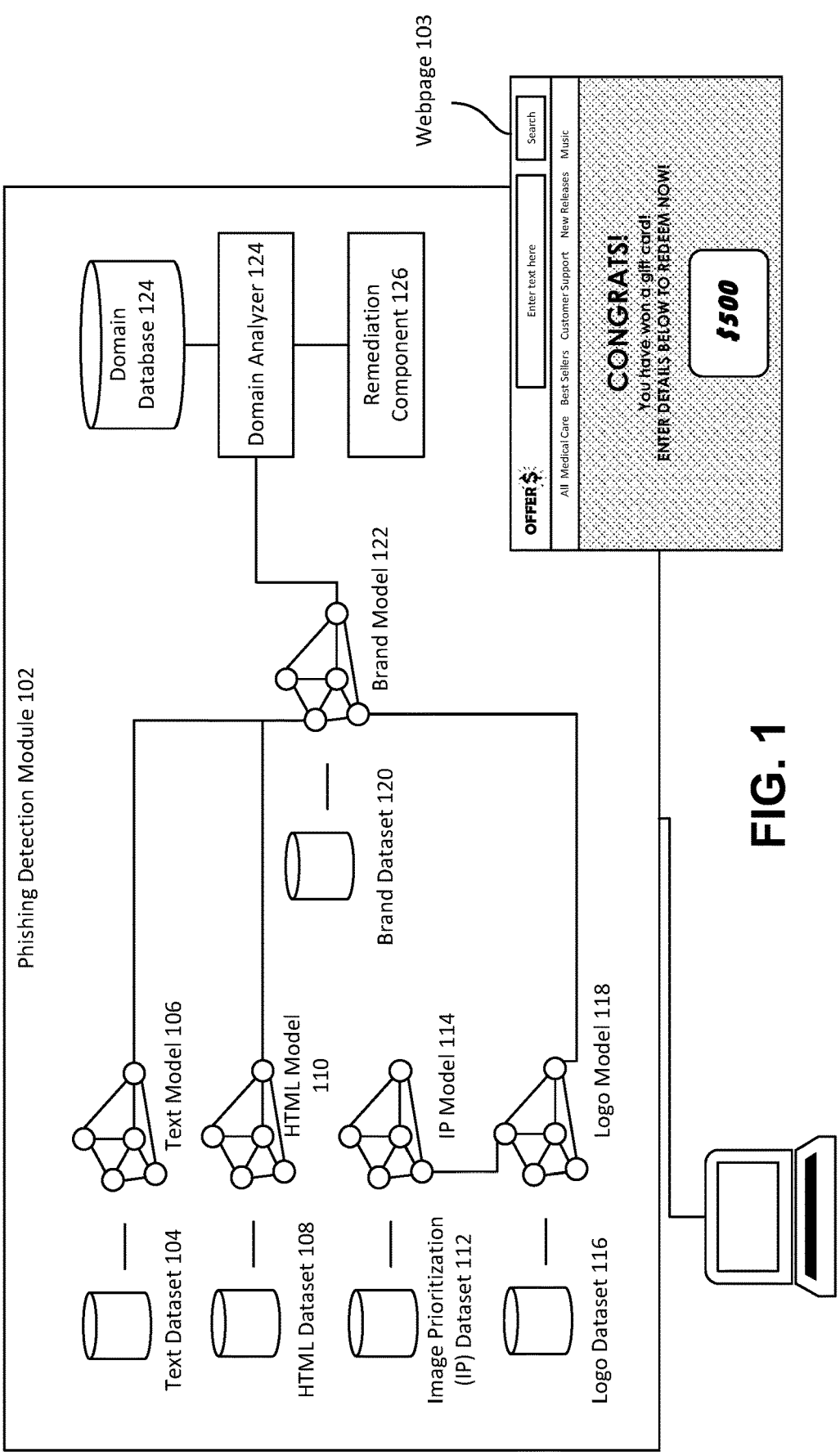
FIG. 1 is a block diagram illustrating a system for reference-based detection of phishing webpages.

FIG. 1 is a block diagram illustrating a system 100 for reference-based detection of phishing webpages. System 100 includes phishing detection module 102, which is executed by computing device 101 (e.g., computer system 20 described in FIG. 6). Phishing detection module 102 includes a plurality of AI models including text model 106, HTML model 110, image prioritization (IP) model 114, logo model 118, and brand model 122. Each of these models may be a machine learning model or a deep learning model. The models may be trained on text dataset 104, HTML dataset 108, IP dataset 112, logo dataset 116, and brand dataset 120, respectively. In some aspects, the AI models may be pre-trained and the datasets for training may not be a part of phishing detection module 102.

Phishing detection module 102 may further include domain analyzer 124, which refers to domain database 124 to compare look up a domain of a brand output by brand model 122 and determine whether the domain matches a domain of webpage 103. If the domain does not match, webpage 103 is classified as a phishing webpage and remediation component 126 executes a remediation action (e.g., blocks the webpage 103).

In some aspects, phishing detection module 102 is part of an anti-virus software that is run on computing device 101. In some aspects, phishing detection module 102 is divided into a thin and thick client application. The thick client application may perform processor and memory heavy tasks such as training each of the AI models, running the AI models on a given webpage 103, and generating a classification of webpage 103. The thick client application may be run on a remote server. The thin client application may perform simple tasks such as displaying the classification from the thick client application and executing a remediation action (e.g., preventing a browser from loading webpage 103). The thin client application may run on a local computing device such as a laptop or a smartphone. Whenever a user comes across a link (e.g., in an email), the thin client application may transmit (e.g., over the Internet) the link for analysis to the thick client application. The thick client application may return a classification, which the thin client application uses to perform a remediation action if necessary.

Figure 2:
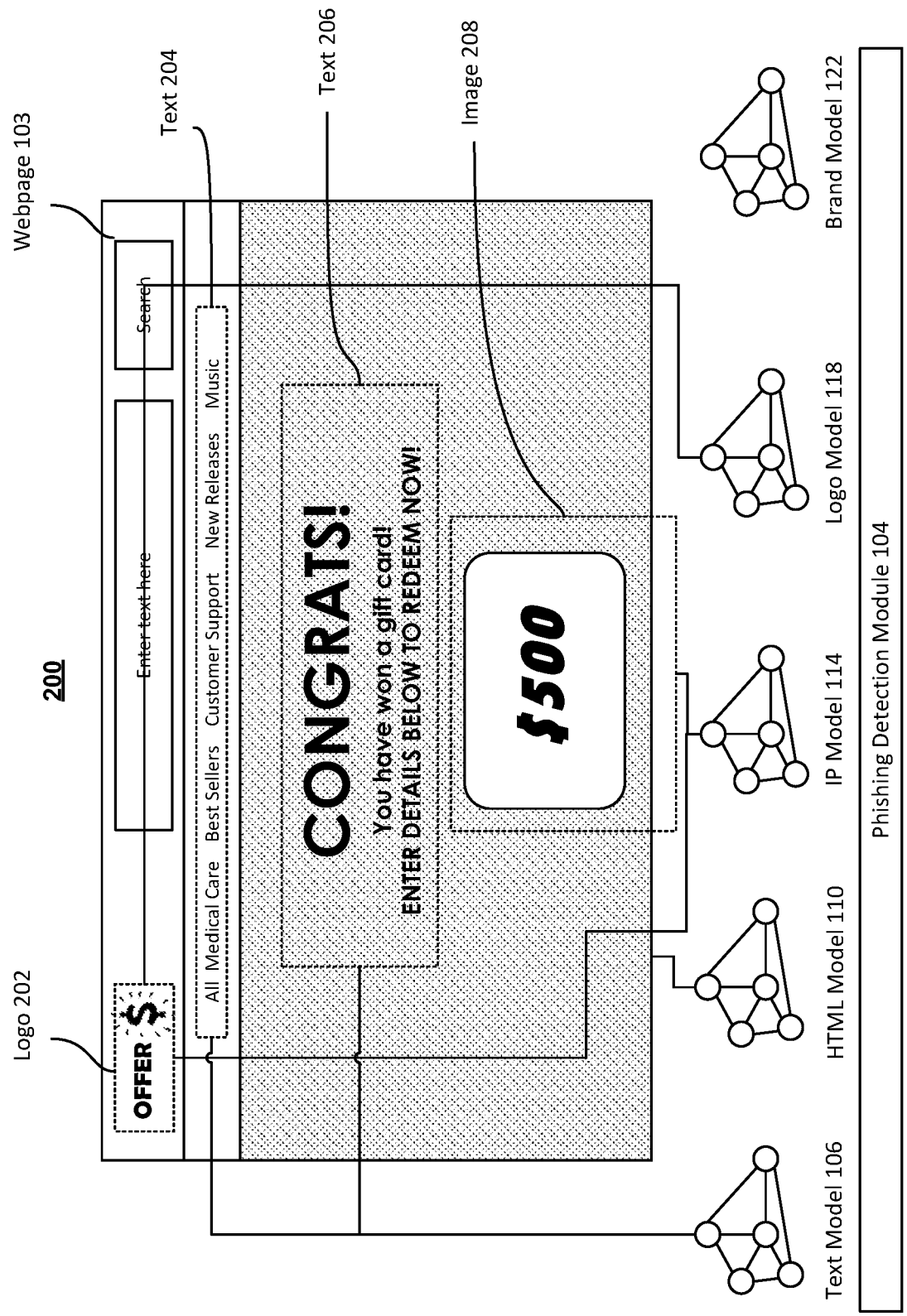
FIG. 2 is a diagram depicting a high-level analysis of a webpage.

FIG. 2 is a diagram 200 depicting a high-level analysis of a webpage 103. Given webpage 103, phishing detection module 104 extracts HTML contents (e.g., contents, images, style sheets, etc., to multiple depths) as well as the screenshot of the landing page. This can be from an embodiment inside the web browser, from a web proxy, from an active component that visits the website independently, or from other sources.

The AI models of phishing detection module 104 are trained to collectively identify the brand (e.g., PayPal) of webpage 103, based on the different input retrieved from webpage 103—making the detection "reference-based."

Text model 106, which is trained to identify texts from webpages of different brands (e.g., PayPal, Apple, etc.), is used to identify the brand probabilistically. The list of brands may be the top most common websites and relevant websites for the user potentially based on their geographical location (e.g., well-known regional banks). The textual data is extracted from the HTML contents, favicon titles, image titles, etc. For example, text model 106 may be provided inputs of textual data such as text 204 and text 206, and may output a brand based on the input text.

HTML model 110, which is trained to identify HTML contents from webpages of different brands, is used to identify the brand probabilistically. HTML model 110 takes all HTML data including elements such as tags into account, but ignores the static text content on the webpage. HTML model 110 also outputs a brand name.

In some aspects, HTML model 110 and text model 106 are natively trained on more than 100,000 websites rather than using existing pre-trained models (e.g., BERT), and then fine-tuning the pre-trained models specifically for phishing detection purposes.

IP model 114 is configured to prioritize images on a website (including favicon) for logo-identification. For example, IP model 114 may be provided logo 202 and image 208. IP model 114 may then determine the likelihood of an input image being a logo. The prioritization is, for example, influenced by the size of the image and the absolute position on the webpage (e.g., a large image on the top left might be a logo). The images of webpage 103 are ranked by the likelihoods and are classified by logo model 118.

Logo model 118 is trained to identify the brand associated with an input logo. A website may have several images, and it may be practically possible only to classify one or two of them because the webpage has to be rendered to the user within a threshold period of time. IP model 114 may indicate that logo 202 should be processed by logo model 118 before image 208. Accordingly, the identification of the brand is faster and if logo model 118 has a confidence score higher than a threshold probability, the analysis may end at logo 202 without the need to process image 208.

In some aspects, IP model 114 and logo model 118 may analyze screenshots of webpage 103, rather than the individual images in webpage 103. This is because spoofed logos in a phishing webpage may be split up into multiple images to make detection of each individual file harder.

The prediction probabilities of text model 106, HTML model 110, and logo model 118 are then taken by brand model 122 to identify the brand of webpage 103. For example, rather than a singular output of a brand, each of text model 106, HTML model 110, and logo model 118 may output a matrix that lists a plurality of brands and, for each brand, a probability of the text/HTML contents/logo(s) being associated with the brand. Brand model 122 may receive these three matrices and output one brand name with the highest overall likelihood.

Domain database 124 includes a plurality of domains, each mapped to a respective brand. Domain analyzer 124 first looks up the domain of the output brand from brand model 122. Domain analyzer 124 then determines the domain name of webpage 103. Domain analyzer 124 compares the domain name of the brand with the domain name of webpage 103. A match indicates that webpage 103 is legitimate, whereas a lack of a match indicates that webpage 103 is a phishing webpage.

In some aspects, domain database 124 is frequently updated from the backend when new websites appear by known brands. It should be noted that there may be multiple domains per brand (e.g., regional subsites of banks). The greater the number of webpages the models are trained on, the more accurate phishing detection module becomes.

In some aspects, a similar approach of models may also be used to detect other malicious websites that try to abuse the reputation of a brand (e.g., fake online shops that sell knockoff products).

Figure 3:
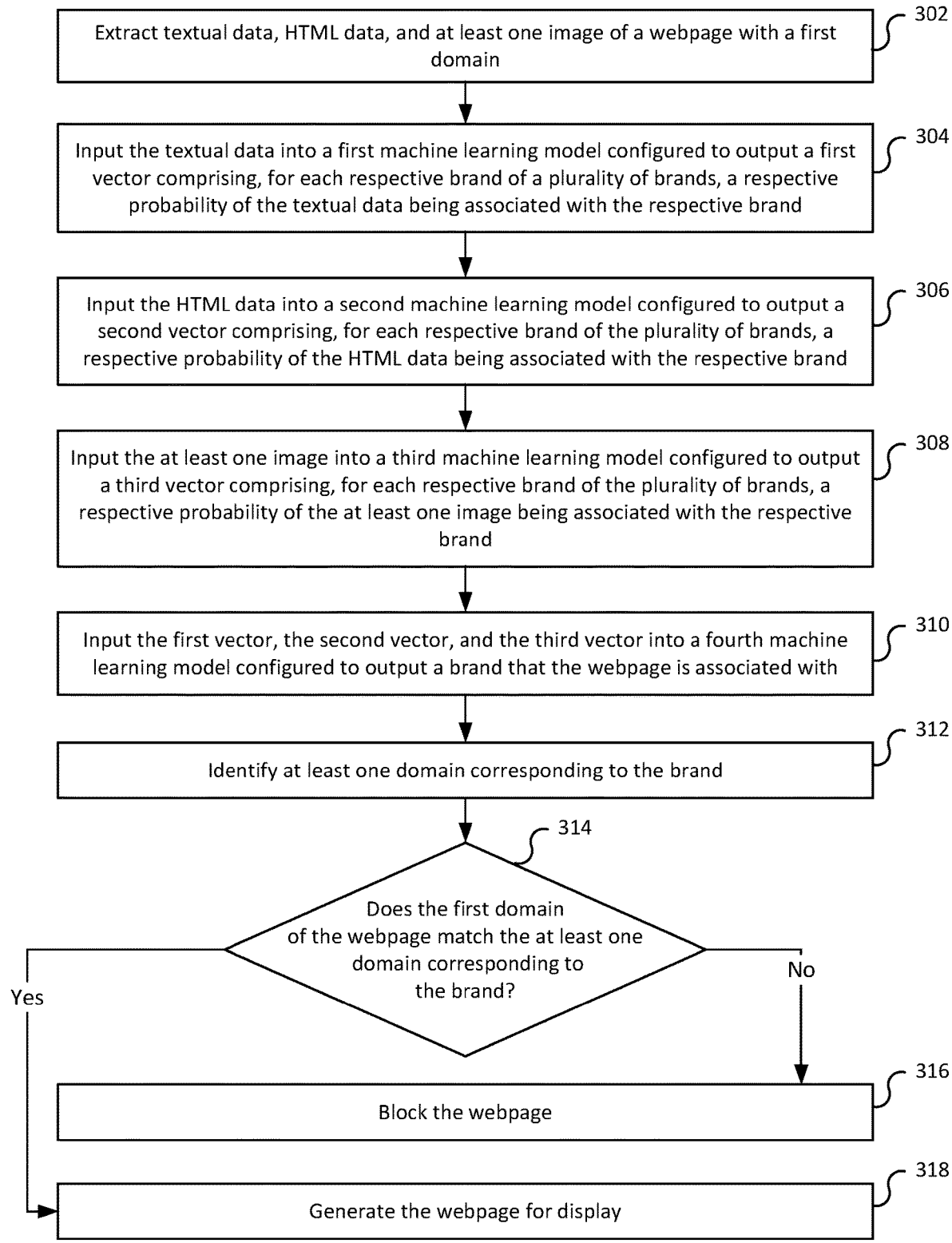
FIG. 3 illustrates a flow diagram of a method for reference-based detection of phishing webpages.

FIG. 3 illustrates a flow diagram of method 300 for reference-based detection of phishing webpages.

At 302, phishing detection module 102 extracts (e.g., using web crawling algorithms) textual data (e.g., static text such as text 204 and text 206), HTML data (e.g., HTML elements such as tags), and at least one image (e.g., logo 202) of a webpage 103 with a first domain. In general, a domain is a string of text that maps to an alphanumeric IP address, used to access a website from client software. The first domain may be, for example, "brandzBonline.com".

In some aspects, phishing detection module 102 extracts the textual data, the HTML data, and the at least one image of the webpage in response to receiving a request to generate the webpage for display. For example, a user of computing device 101 may receive a link including a URL of the webpage. In response to the user selecting the link to open the webpage on a browser, phishing detection module 102 may analyze the webpage for legitimacy.

Method 300 subsequently involves inputting the extracted data and receiving vectors from multiple machine learning models, which are each classification models (e.g., Bayes classifiers).

At 304, phishing detection module 102 inputs the textual data into a first machine learning model (e.g., text model 106) configured to output a first vector including, for each respective brand of a plurality of brands, a respective probability of the textual data being associated with the respective brand. In a simple example, suppose that there are three known brands: A, B, C. The first vector may be structured as:

| Brand | A | B | C |
|---|---|---|---|
| Probability | 4% | 85% | 40% |

In this case, the text used in the webpage 103 has a likelihood of being related to brand B. For example, the text may discuss a product sold by brand B.

At 306, phishing detection module 102 inputs the HTML data into a second machine learning model (e.g., HTML model 110) configured to output a second vector including, for each respective brand of the plurality of brands, a respective probability of the HTML data being associated with the respective brand.

The second vector may be structured as:

| Brand | A | B | C |
|---|---|---|---|
| Probability | 50% | 95% | 70% |

In this case, the HTML contents used in the webpage 103 has a likelihood of being related to brand B. Because many websites using similar HTML contents, the probabilities for each of the vectors may be high.

At 308, phishing detection module 102 inputs the at least one image into a third machine learning model (e.g., logo model 118) configured to output a third vector comprising, for each respective brand of the plurality of brands, a respective probability of the at least one image being associated with the respective brand.

The third vector may be structured as:

| Brand | A | B | C |
|---|---|---|---|
| Probability | 10% | 97% | 10% |

In this case, the images used in the webpage 103 have a likelihood of being related to brand B. For example, webpage 103 may use a logo that belongs to brand B.

At 310, phishing detection module 102 inputs the first vector, the second vector, and the third vector into a fourth machine learning model (e.g., brand model 122) configured to output a brand that the webpage is associated with. For example, brand model 122 may execute a function that applies different weights on each of the probabilities and combines them. For example, brand model 122 may learn an optimized function that multiples each of the probabilities with the following weights {2, 1, 3} and adds the products. This may result in an intermediate vector:

| Brand | A | B | C |
|---|---|---|---|
| Weighted Score | 88 | 556 | 180 |

Brand model 122 may identify the brand with the highest weighted score. In this case, brand B is outputted.

At 312, phishing detection module 102 identifies at least one domain corresponding to the brand. For example, phishing detection module 102 may refer to domain database 124, which lists domains for each of the brands.

At 314, phishing detection module 102 determines whether the first domain of the webpage matches the at least one domain corresponding to the brand. In response to determining that the first domain of the webpage does not match the at least one domain corresponding to the brand, method 300 advances to 316, where phishing detection module 102 blocks the webpage. Suppose that the sole domain name used by brand B is "brandBproducts.com". In this case, there is no match and therefore webpage 103 is not legitimate. Phishing detection module 102 executes a remediation action to prevent the webpage from being loaded by a browser.

In an alternate example, suppose that the domain of brand B is "brandzBonline.com". In response to determining that the first domain of the webpage matches the at least one domain corresponding to the brand, method 300 advances to 318, where phishing detection module 102 generates the webpage for display.

Figure 4:
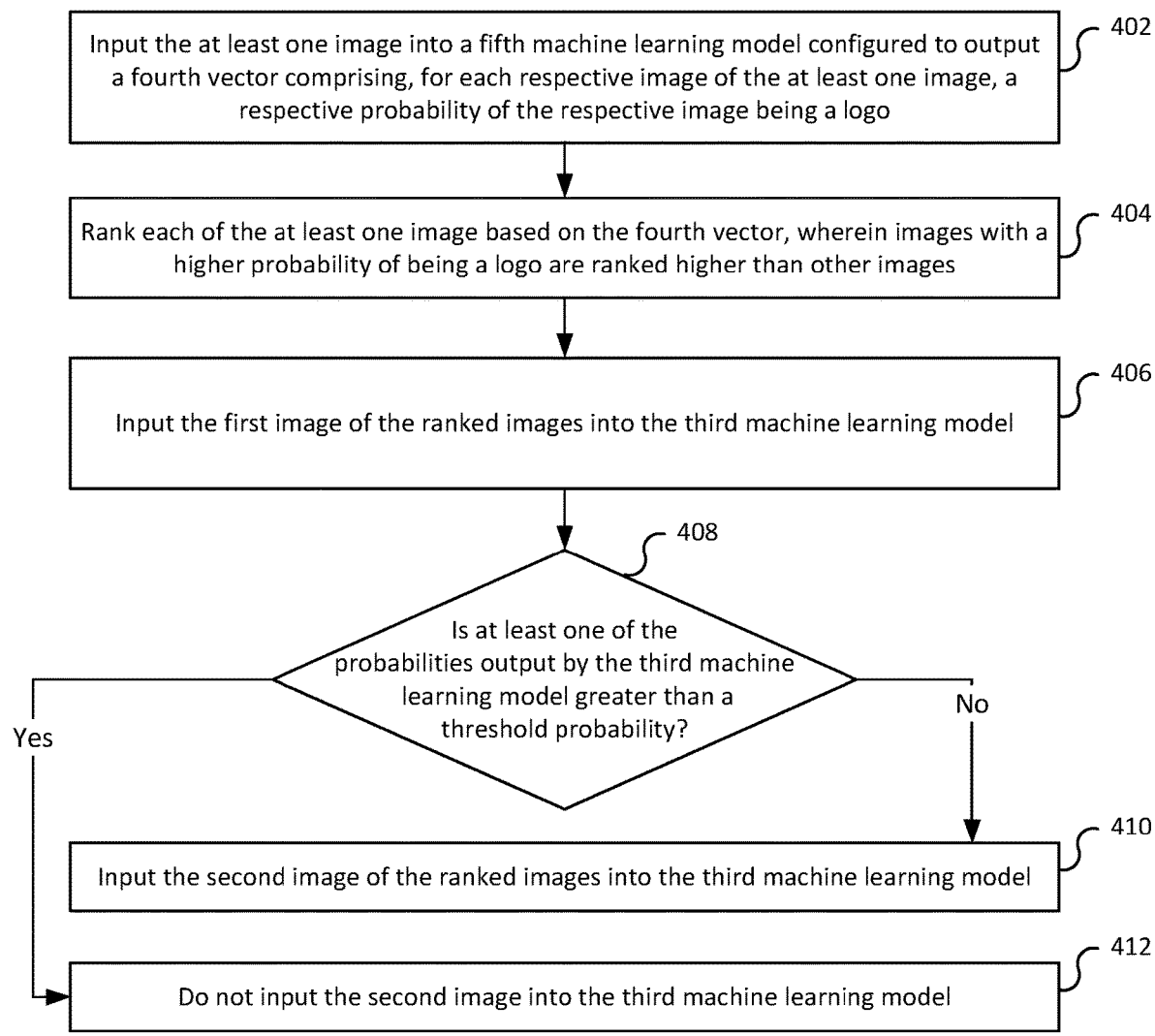
FIG. 4 illustrates a flow diagram of a method for prioritizing images for analysis of the webpage.

FIG. 4 illustrates a flow diagram of method 400 for prioritizing images for analysis of the webpage.

At 402, phishing detection module 102 inputs the at least one image (e.g., including a first image and a second image) into a fifth machine learning model (e.g., IP model 114) configured to output a fourth vector comprising, for each respective image of the at least one image, a respective probability of the respective image being a logo. For example, the fourth vector may be structured as:

| Image | Logo 202 | Image 208 |
|---|---|---|
| Probability | 90% | 40% |

At 404, phishing detection module 102 ranks each of the at least one image based on the fourth vector. In this ranking, images with a higher probability of being a logo are ranked higher than other images. For example, logo 202 may be ranked higher than image 208. The order of this rank serves as a queue of input images for logo model 118.

At 406, phishing detection module 102 inputs a first image (e.g., logo 202) of the ranked images into the third machine learning model (e.g., logo model 118) and receives an output vector. For example, the output vector may be:

| Brand | A | B | C |
|---|---|---|---|
| Probability | 50% | 95% | 70% |

At 408, phishing detection module 102 determines whether at least one of the probabilities is greater than a threshold probability (e.g., 90%). In response to determining that none of the probabilities are greater than the threshold probability, method 400 advances to 410, where phishing detection module 102 inputs a second image (e.g., image 208) of the ranked images into the third machine learning model. In response to determining that at least one of the probabilities is greater than the threshold probability, method 400 advances to 412, where phishing detection module 102 does not input a second image of the ranked images into the third machine learning model. The second image is not input to save processing resources as the first image is a high likely candidate of being associated with a brand.

Figure 5:
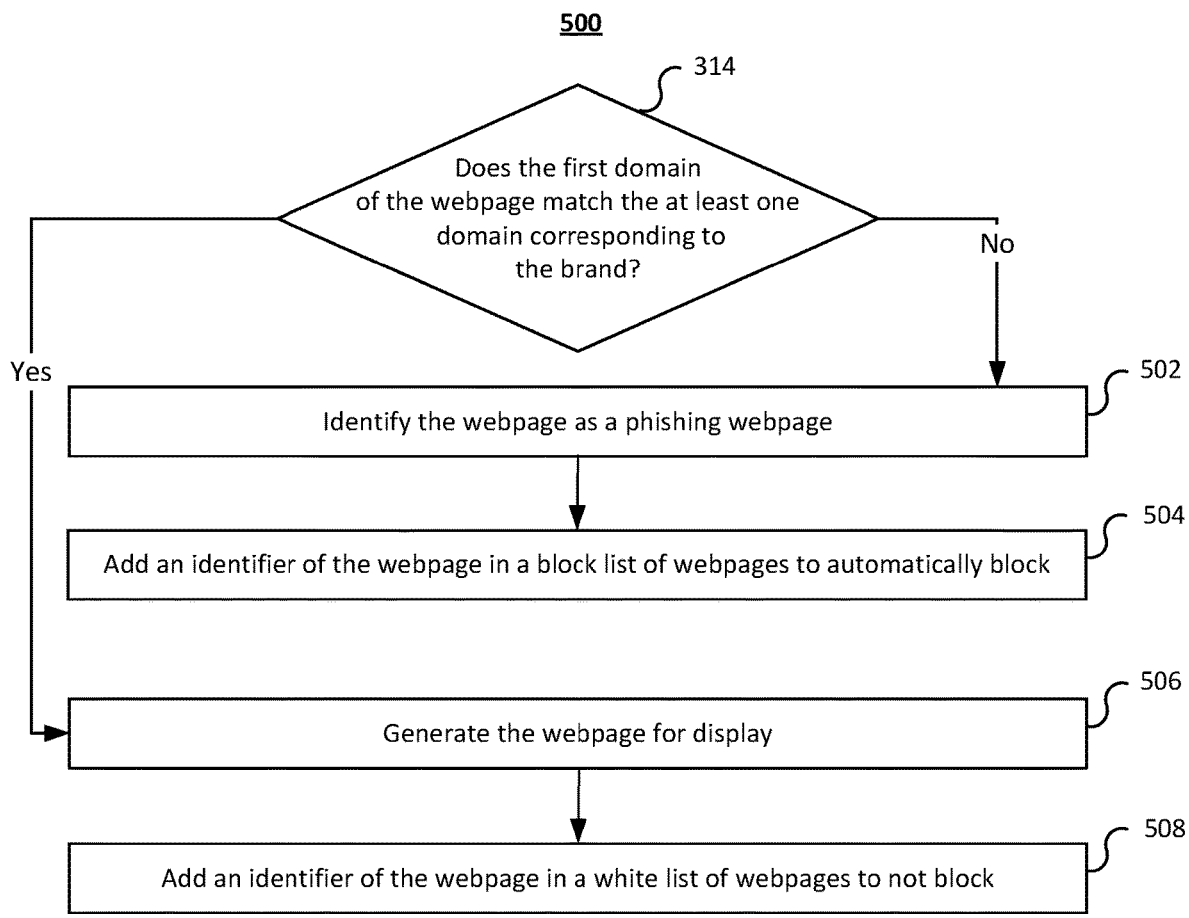
FIG. 5 illustrates a flow diagram of a method for executing remediation actions for a webpage.

FIG. 5 illustrates a flow diagram of method 500 for executing remediation actions for a webpage. Method 500 may advance from 314. In response to determining that the first domain of the webpage does not match the at least one domain corresponding to the brand, method 500 advances to 502, where phishing detection module 102 identifies the webpage as a phishing webpage. At 504, phishing detection module 102 adds an identifier (e.g., a URL or domain) of the webpage in a block list of webpages to automatically block.

In response to determining that the first domain of the webpage matches the at least one domain corresponding to the brand, method 500 advances from 314 to 506, where phishing detection module 102 identifies the webpage as a safe webpage. At 508, phishing detection module 102 adds an identifier of the webpage in a white list of webpages to not block.

Figure 6:
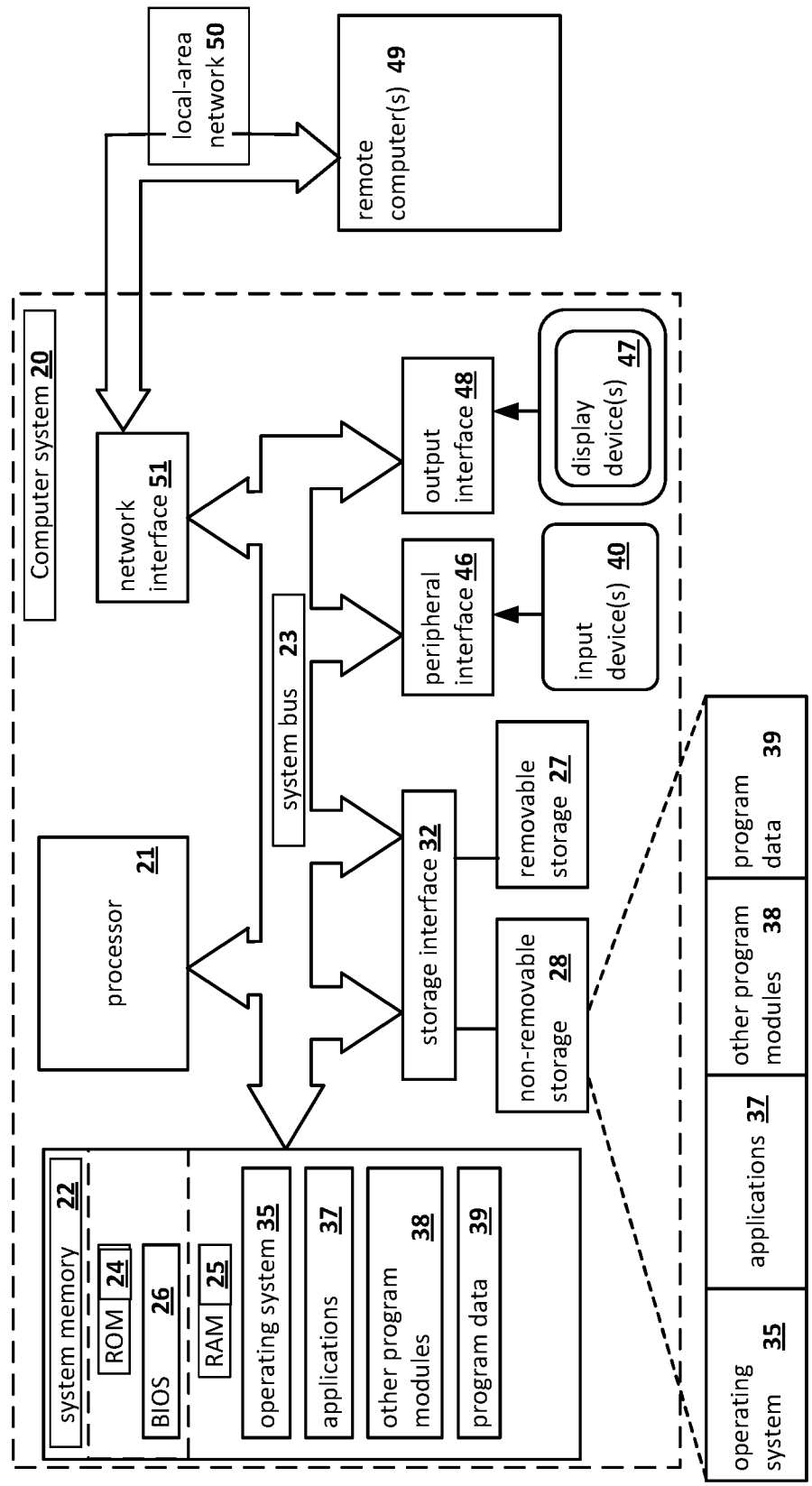
FIG. 6 presents an example of a general-purpose computer system on which aspects of the present disclosure can be implemented.

FIG. 6 is a block diagram illustrating a computer system 20 on which aspects of systems and methods for reference-based detection of phishing webpages may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detection of phishing webpages using machine learning, the method comprising:
   extracting textual data, HTML data, and at least one image of a webpage with a first domain;
   inputting the textual data into a first machine learning model configured to output a first vector comprising, for each respective brand of a plurality of brands, a respective probability that the textual data is associated with the respective brand;
   inputting the HTML data into a second machine learning model configured to output a second vector comprising, for each respective brand of the plurality of brands, a respective probability that the HTML data is associated with the respective brand;
   ranking each of the at least one image based on a probability that a given image is a logo, wherein the at least one image comprises at least a first image and a second image, and wherein the first image has a higher probability and is ranked higher than the second image;
   inputting the first image into a third machine learning model configured to output a third vector comprising, for each respective brand of the plurality of brands, a respective probability that the first image is associated with the respective brand, wherein the second image is not input into the third machine learning model in response to determining that at least one probability associated with the first image is greater than a threshold probability;
   inputting the first vector, the second vector, and the third vector into a fourth machine learning model configured to output a brand that the webpage is associated with;
   identifying at least one domain corresponding to the brand; and
   blocking the webpage in response to determining that the first domain of the webpage does not match the at least one domain corresponding to the brand.

2. The method of claim 1, wherein ranking each of the at least one image further comprises:
   inputting the at least one image into a fifth machine learning model configured to output a fourth vector comprising, for each respective image of the at least one image, a respective probability that the respective image is the logo;
   ranking each of the at least one image based on the fourth vector, wherein images with a higher probability of being a logo are ranked higher than other images.

3. The method of claim 1, further comprising:
in response to determining that no probability associated with the first image is greater than the threshold probability, inputting the second image into the third machine learning model.

4. The method of claim 1, further comprising:
in response to determining that the first domain of the webpage does not match the at least one domain corresponding to the brand, identifying the webpage as a phishing webpage;
adding an identifier of the webpage in a block list of webpages to automatically block.

5. The method of claim 1, further comprising:
in response to determining that the first domain of the webpage matches the at least one domain corresponding to the brand, generating the webpage for display.

6. The method of claim 1, further comprising:
in response to determining that the first domain of the webpage matches the at least one domain corresponding to the brand, identifying the webpage as a safe webpage; and
adding an identifier of the webpage in a white list of webpages to not block.

7. The method of claim 1, wherein extracting the textual data, the HTML data, and the at least one image of the webpage is in response to receiving a request to generate the webpage for display.

8. A system for detection of phishing webpages using machine learning, comprising:
at least one memory;
at least one hardware processor coupled with the at least one memory and configured, individually or in combination, to:
extracting textual data, HTML data, and at least one image of a webpage with a first domain;
input the textual data into a first machine learning model configured to output a first vector comprising, for each respective brand of a plurality of brands, a respective probability that the textual data is associated with the respective brand;
input the HTML data into a second machine learning model configured to output a second vector comprising, for each respective brand of the plurality of brands, a respective probability that the HTML data being is associated with the respective brand;
rank each of the at least one image based on a probability that a given image is a logo, wherein the at least one image comprises at least a first image and a second image, and wherein the first image has a higher probability and is ranked higher than the second image;
inputting the first image into a third machine learning model configured to output a third vector comprising, for each respective brand of the plurality of brands, a respective probability that the first image is associated with the respective brand, wherein the second image is not input into the third machine learning model in response to determining that at least one probability associated with the first image is greater than a threshold probability;
input the first vector, the second vector, and the third vector into a fourth machine learning model configured to output a brand that the webpage is associated with;
identify at least one domain corresponding to the brand; and block the webpage in response to determining that the first domain of the webpage does not match the at least one domain corresponding to the brand.

9. The system of claim 8, wherein ranking each of the at least one image further comprises:
inputting the at least one image into a fifth machine learning model configured to output a fourth vector comprising, for each respective image of the at least one image, a respective probability that the respective image is the logo;
ranking each of the at least one image based on the fourth vector, wherein images with a higher probability of being a logo are ranked higher than other images.

10. The system of claim 8, further comprising:
in response to determining that no probability associated with the first image is greater than the threshold probability, inputting the second image into the third machine learning model.

11. The system of claim 8, further comprising:
in response to determining that the first domain of the webpage does not match the at least one domain corresponding to the brand, identifying the webpage as a phishing webpage;
adding an identifier of the webpage in a block list of webpages to automatically block.

12. The system of claim 8, further comprising:
in response to determining that the first domain of the webpage matches the at least one domain corresponding to the brand, generating the webpage for display.

13. The system of claim 8, further comprising:
in response to determining that the first domain of the webpage matches the at least one domain corresponding to the brand, identifying the webpage as a safe webpage; and
adding an identifier of the webpage in a white list of webpages to not block.

14. The system of claim 8, wherein extracting the textual data, the HTML data, and the at least one image of the webpage is in response to receiving a request to generate the webpage for display.

15. A non-transitory computer readable medium storing thereon computer executable instructions for detection of phishing webpages using machine learning, including instructions for:
extracting textual data, HTML data, and at least one image of a webpage with a first domain;
inputting the textual data into a first machine learning model configured to output a first vector comprising, for each respective brand of a plurality of brands, a respective probability that the textual data is associated with the respective brand;
inputting the HTML data into a second machine learning model configured to output a second vector comprising, for each respective brand of the plurality of brands, a respective probability that the HTML data is associated with the respective brand;
ranking each of the at least one image based on a probability that a given image is a logo, wherein the at least one image comprises at least a first image and a second image, and wherein the first image has a higher probability and is ranked higher than the second image;
inputting the first image into a third machine learning model configured to output a third vector comprising, for each respective brand of the plurality of brands, a respective probability that the first image is associated with the respective brand, wherein the second image is not input into the third machine learning model in response to determining that at least one probability associated with the first image is greater than a threshold probability;

inputting the first vector, the second vector, and the third vector into a fourth machine learning model configured to output a brand that the webpage is associated with;

identifying at least one domain corresponding to the brand; and blocking the webpage in response to determining that the first domain of the webpage does not match the at least one domain corresponding to the brand.

\* \* \* \* \*